United States Patent
Inao et al.

(10) Patent No.: US 9,776,580 B2
(45) Date of Patent: Oct. 3, 2017

(54) WIRE HARNESS

(71) Applicant: Yazaki Corporation, Minato-ku, Tokyo (JP)

(72) Inventors: Shinichi Inao, Makinohara (JP); Tatsuya Oga, Makinohara (JP); Hideomi Adachi, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/992,095

(22) Filed: Jan. 11, 2016

(65) Prior Publication Data

US 2016/0121820 A1   May 5, 2016

Related U.S. Application Data

(63) Continuation of application No. PCT/JP2014/068364, filed on Jul. 9, 2014.

(30) Foreign Application Priority Data

Jul. 12, 2013   (JP) ................. 2013-146318

(51) Int. Cl.
  *B60R 16/02* (2006.01)
  *H02G 3/04* (2006.01)
  *H02G 3/32* (2006.01)

(52) U.S. Cl.
  CPC ...... *B60R 16/0207* (2013.01); *B60R 16/0215* (2013.01); *H02G 3/0487* (2013.01); *H02G 3/0468* (2013.01); *H02G 3/32* (2013.01)

(58) Field of Classification Search
  USPC ...................................... 174/72 A
  See application file for complete search history.

(56) References Cited

U.S. PATENT DOCUMENTS

2,186,793 A * 1/1940 Wodtke ................ H01B 7/1895
                                                    156/55
2,446,387 A * 8/1948 Peterson .................. H01B 9/02
                                                    174/102 C (Continued)

FOREIGN PATENT DOCUMENTS

CN   101622123 A   1/2010
CN   201601426 U   10/2010

(Continued)

OTHER PUBLICATIONS

Oct. 14, 2014—(WO) Written Opinion of the ISA—Intl App PCT/JP2014/068364, Eng Tran.

(Continued)

*Primary Examiner* — William H Mayo, III
*Assistant Examiner* — Krystal Robinson
(74) *Attorney, Agent, or Firm* — Banner & Witcoff, Ltd.

(57) ABSTRACT

A wire harness is provided with an electrically conductive path, a tubular sheath member which accommodates the electrically conductive path in an inner part, and a sheet member positioned between at least a part of a circumferential direction of the electrically conductive path and an inner peripheral surface of the sheath member. The sheet member may be wound on the electrically conductive path so as to cover an entire area in the circumferential direction. The sheet member may be intermittently arranged in an axial direction of a tube of the sheath member.

9 Claims, 5 Drawing Sheets

(56) References Cited

U.S. PATENT DOCUMENTS

| | | | | |
|---|---|---|---|---|
| D206,387 | S | * | 12/1966 | Seckel .......................... 138/121 |
| 3,394,207 | A | * | 7/1968 | Andersen ............ B29C 44/1242 |
| | | | | 138/DIG. 9 |
| 3,766,307 | A | * | 10/1973 | Andrews, Jr. ........ G02B 6/4415 |
| | | | | 174/101.5 |
| 4,706,711 | A | * | 11/1987 | Czvikovszky ....... B29D 23/001 |
| | | | | 138/103 |
| 6,102,078 | A | * | 8/2000 | Kramer, Jr. ............. B29C 53/30 |
| | | | | 138/121 |
| 8,839,822 | B2 | * | 9/2014 | Quigley .................... F16L 9/19 |
| | | | | 138/104 |
| 8,873,926 | B2 | * | 10/2014 | Beamon ............... G02B 6/4248 |
| | | | | 385/134 |
| 2002/0081878 | A1 | * | 6/2002 | Bruno .................... H01R 35/02 |
| | | | | 439/164 |
| 2005/0006127 | A1 | * | 1/2005 | Shimura .............. H01R 13/648 |
| | | | | 174/72 A |
| 2008/0135119 | A1 | | 6/2008 | Tonooka et al. |
| 2010/0283287 | A1 | * | 11/2010 | Toyozumi ........... B60R 16/0215 |
| | | | | 296/146.9 |
| 2011/0162885 | A1 | | 7/2011 | Yamaguchi et al. |
| 2013/0112473 | A1 | | 5/2013 | Toyama et al. |
| 2013/0118799 | A1 | | 5/2013 | Watanabe et al. |
| 2014/0110011 | A1 | * | 4/2014 | Omura ................. H02G 3/0468 |
| | | | | 138/109 |
| 2014/0131095 | A1 | | 5/2014 | Toyama et al. |
| 2014/0165392 | A1 | | 6/2014 | Toyama et al. |
| 2015/0251609 | A1 | * | 9/2015 | Sugimoto ........... B60R 16/0215 |
| | | | | 174/68.3 |
| 2016/0000300 | A1 | * | 1/2016 | Williams ........... A61B 1/00016 |
| | | | | 600/109 |
| 2016/0254654 | A1 | * | 9/2016 | Matsumura ............... F16B 2/08 |
| | | | | 24/16 R |

FOREIGN PATENT DOCUMENTS

| | | | |
|---|---|---|---|
| CN | 103004042 A | | 3/2013 |
| JP | 2006296166 A | * | 10/2006 |
| JP | 2010-009866 A | | 1/2010 |
| JP | 2010009866 A | * | 1/2010 |
| JP | 2012-029385 A | | 2/2012 |
| JP | 2012-210101 A | | 10/2012 |
| JP | 2013-042648 A | | 2/2013 |
| JP | 2013026015 A | | 2/2013 |
| JP | 2013042648 A | * | 2/2013 |

OTHER PUBLICATIONS

Oct. 14, 2014—International Search Report—Intl App PCT/JP2014/068364.

Dec. 5, 2016—(CN) Notification of The First Office Action—App 201480039827.1—Eng Tran.

Apr. 4, 2017—(JP) Office Action—App 2013-146318—Machine Eng Tran.

Apr. 25, 2017—(CN) Second Office Action—App 201480039827.1—Eng Tran.

* cited by examiner

WIRE HARNESS

CROSS REFERENCE TO RELATED APPLICATIONS

This application is a continuation of PCT application No. PCT/JP2014/068364, which was filed on Jul. 9, 2014 based on Japanese Patent Application (No. 2013-146318) filed on Jul. 12, 2013, the contents of which are incorporated herein by reference.

BACKGROUND OF THE INVENTION

Field of the Invention

The present invention relates to a wire harness.

Description of Related Art

Usually, a wire harness is known which electrically connects together high voltage devices mounted on a hybrid motor vehicle or an electric vehicle. The wire harness is formed with an electrically conductive path and a sheath member which accommodates the electrically conductive path therein as main members. The sheath member is formed with a hollow tubular member, which is desired to be hardly bent even when a bending stress is applied thereto by considering a protection of the electrically conductive path, a regulation of the path and a working property when the wire harness is attached to the vehicle.

On the other hand, a sheath member is known which partly includes a part having flexibility in order to ensure a degree of freedom for bending which meets an arrangement or wiring path or to make easy a treatment during a packing or transportation.

For instance, Patent literature 1 discloses a wire harness including a plurality of groups of electric wires corresponding to the electrically conductive path and a harness protecting member corresponding to the sheath member. Here, the harness protecting member includes harness protecting pipes and bellows shaped harness protecting pipes which are alternately connected. The harness protecting pipes are arranged in a straight line part of an arrangement or wiring path of the wire harness. On the other hand, the bellows shaped harness protecting pipes are bent and arranged in accordance with a curvature of a curve part of the arrangement or wiring path of the wire harness. Thus, the wire harness can be properly attached and protected in accordance with a configuration of the arrangement or wiring path of the wire harness.

[Patent Literature 1]: JP-A-2012-210101

According to a related art, in a wire harness disclosed in the Patent Literature 1, there is an inconvenience that an electrically conductive path accommodated in a tubular sheath member has a fear which the electrically conductive path may be possibly damaged. Specifically, an inner space of the sheath member has a size which considers a margin so as not to prevent an insertion of the electrically conductive path. Accordingly, a clearance is generated between an inner peripheral surface of the sheath member and the electrically conductive path, so that the electrically conductive path sways in an inner part of the sheath member due to a vibration during a travel of a vehicle. The electrically conductive path rubs against the sheath member by such a movement of the electrically conductive path to break the electrically conductive path. Further, since dust or sand enters the sheath member by a secular use, a problem arises that the dust or sand causes the damage to be promoted due to an abrasion.

SUMMARY

One or more embodiments provide a wire harness which can suppress a damage of an electrically conductive path accommodated in a sheath member.

In accordance with one or more embodiments, a wire harness is provided with an electrically conductive path, a tubular sheath member which accommodates the electrically conductive path in an inner part and a sheet member positioned between at least a part of the electrically conductive path in a circumferential direction and an inner peripheral surface of the sheath member.

In the wire harness of one or more embodiments, the sheet member may be wound on the electrically conductive path so as to cover an entire area in the circumferential direction.

In the wire harness of one or more embodiments, the sheet member may be intermittently arranged in an axial direction of a tube of the sheath member.

According to one or more embodiments, the electrically conductive path can be restrained from rubbing against a lower surface side of the sheath member or rubbing against dust or sand and a damage of the electrically conductive path can be properly suppressed.

DETAILED DESCRIPTION

Figure 1:
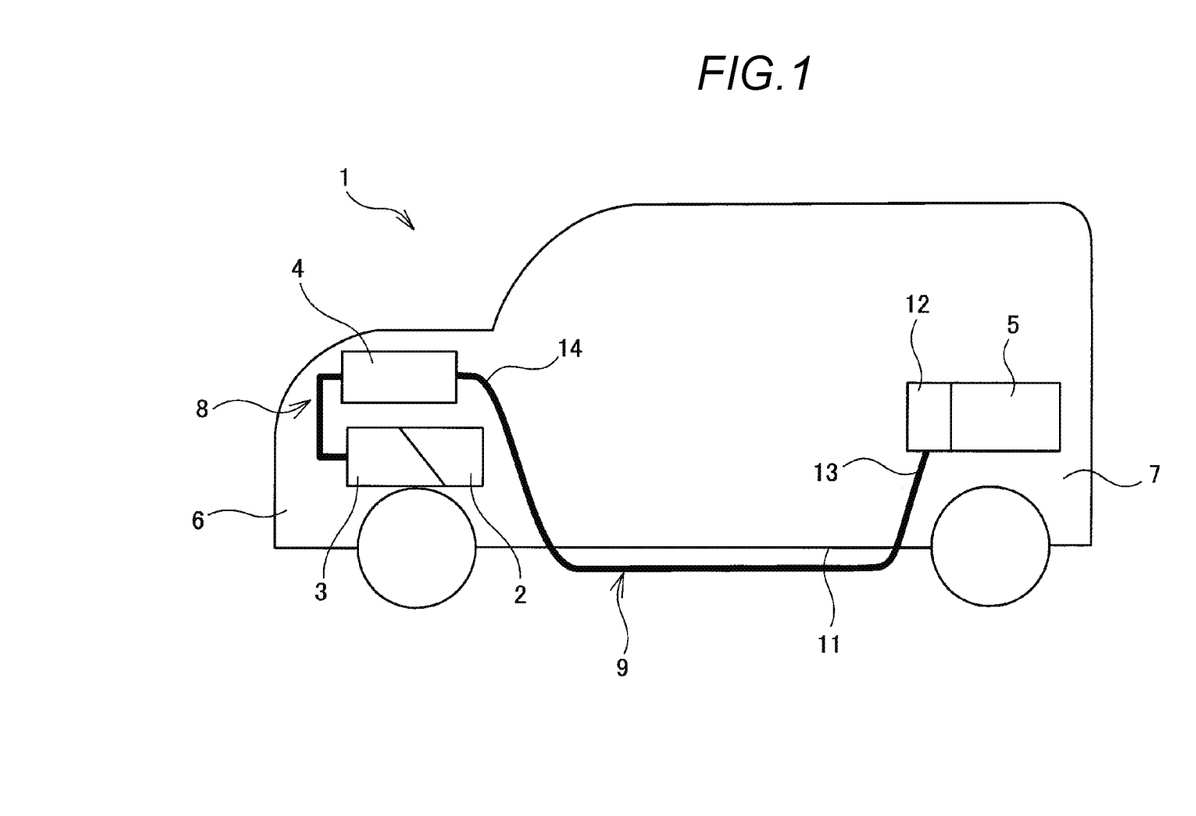
FIG. 1 is a schematic view showing an arranged state of a wire harness according to the present embodiment.

FIG. 1 is a schematic view showing an arranged state of a wire harness 9 according to the present embodiment. The wire harness 9 according to the present embodiment is used for a hybrid motor vehicle 1 and arranged in a prescribed position of the hybrid motor vehicle 1.

The hybrid motor vehicle 1 is a vehicle which is driven by combining together two powers of an engine 2 and a motor unit 3. To the motor unit 3, an electric power from a battery (a battery pack) is supplied through an inverter unit 4. The engine 2, the motor unit 3 and the inverter unit 4 are mounted on an engine room 6 in the vicinity of front wheels. Further, the battery 5 is mounted on a rear part 7 of the motor vehicle in the vicinity of rear wheels, however, the battery may be mounted in an interior of the motor vehicle located in a rear part of the engine room 6.

The motor unit 3 and the inverter unit 4 are connected together by a wire harness 8 for a high voltage. Further, the battery 5 and the inverter unit 4 are also connected together by the wire harness 9. The wire harness 9 is arranged in an under-floor 11 of the motor vehicle by considering a suppression of radiation noise and laid substantially in parallel with and along the under-floor 11 of the motor vehicle. The under-floor 11 of the motor vehicle is a well-known body, what is called a panel member and has through holes formed at prescribed positions. The wire harness 9 is water-tightly inserted into the thorough holes and end parts of the wire harness 9 are respectively introduced to the engine room 6 and the rear part 7 of the motor vehicle.

The wire harness 9 and the battery 5 are connected to each other through a junction block 12. To the junction block 12, a rear end 13 of the wire harness 9 is electrically connected. Further, a front end 14 of the wire harness 9 is electrically connected to the inverter unit 4.

The motor unit 3 functions as a motor and a generator and is formed as a motor assembly including a shield case. Further, the inverter unit 4 includes an inverter and a converter in its structure and is formed as an inverter assembly including a shield case. The battery 5 is an Ni—NH type or an Li-ion type and formed as a module. As the battery 5, a storage battery device such as a capacitor may be used.

Figure 2:
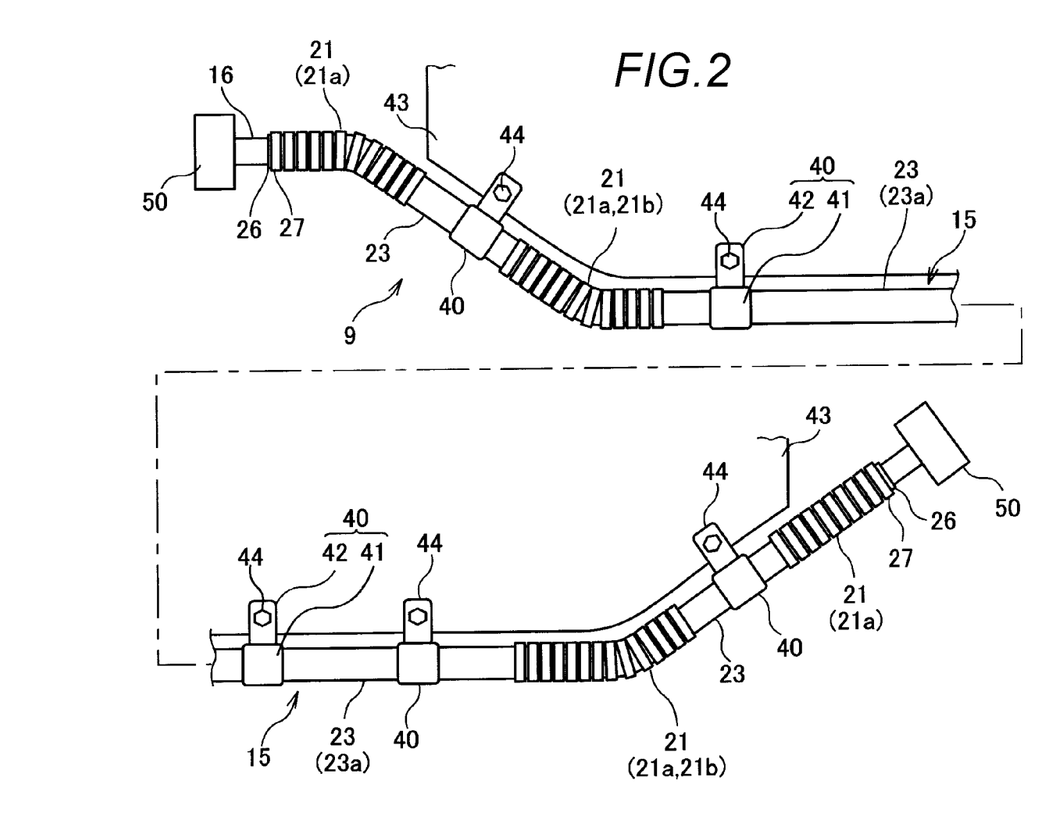
FIG. 2 is a side view which schematically shows the wire harness when a path is arranged.
Figure 3:
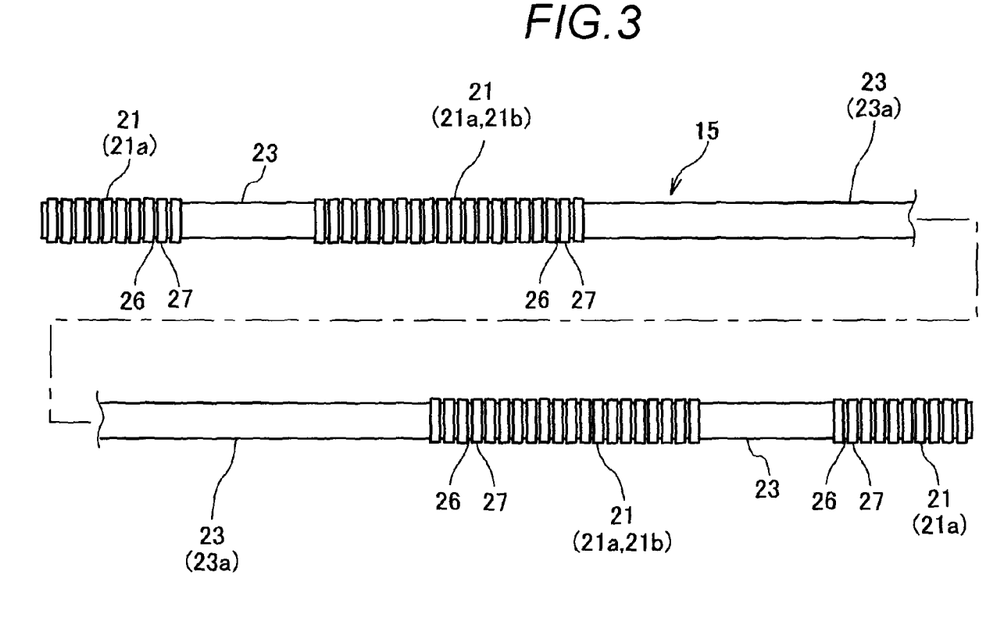
FIG. 3 is a side view schematically showing a sheath member.
Figure 4:
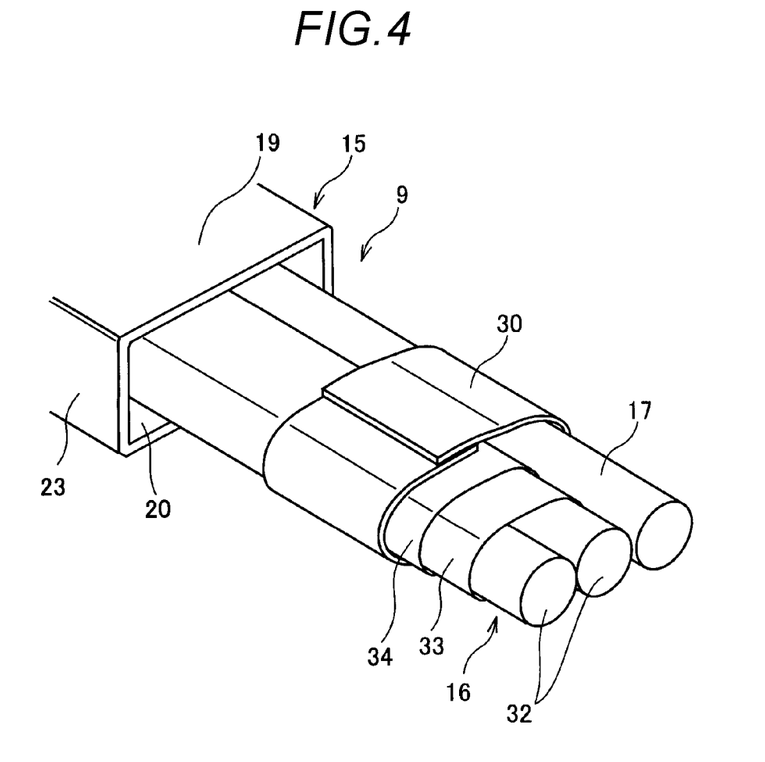
FIG. 4 is a perspective view schematically showing the wire harness and a high voltage electrically conductive path.
Figure 5:
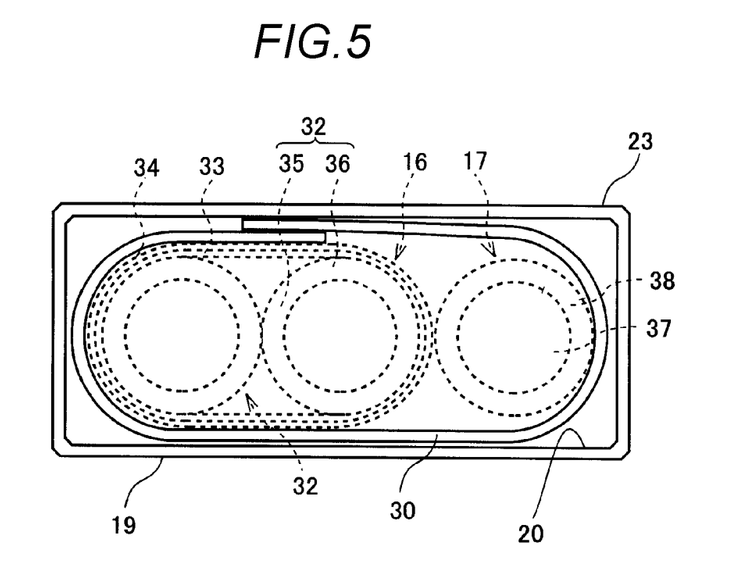
FIG. 5 is a sectional view schematically showing the sheath member.

FIG. 2 is a side view which schematically shows the wire harness 9 when a path is arranged. FIG. 3 is a side view schematically showing a sheath member 15. FIG. 4 is a perspective view schematically showing the wire harness 9 and a high voltage electrically conductive path 16. FIG. 5 is a sectional view schematically showing the sheath member 15. The wire harness 9 includes the sheath member 15 and the high voltage electrically conductive path 16 (an electrically conductive path) which is accommodated and protected in the sheath member as main members.

The sheath member 15 is a member which accommodates the high voltage electrically conductive path 16 therein and protects the high voltage electrically conductive path 16. The sheath member 15 is formed with a tubular member having a rectangular configuration in section and has a long tubular form. The sheath member 15 is formed by a resin molding and set so as to have a length necessary to insert and accommodate the high voltage electrically conductive path 16 and a thickness necessary to protect the high voltage electrically conductive path 16. In the present embodiment, the sheath member 15 accommodates a low voltage electrically conductive path 17 (an electrically conductive path) together with the high voltage electrically conductive path 16.

The sheath member 15 is set to a configuration having no joint, nor slit which leads to an inner peripheral surface from an outer peripheral surface 19 of the sheath member 15.

The sheath member 15 includes one or more corrugated parts 21 and one or more straight parts 23 and is integrally formed under a state that the corrugated parts 21 and the straight parts 23 are connected together in series. The sheath member is configured in such a way that en entire part has a linear form under a state that the corrugated parts 21 are not bent. The corrugated parts 21 and the straight parts 23 are set in arbitrary positions and ranges (lengths) in an axial direction of a tube of the sheath member 15.

The corrugated parts 21 are parts which have a prescribed flexibility in the sheath member 15. The sheath member 15 can be bent at a necessary angle by using the flexibility provided in the corrugated parts 21.

The corrugated parts 21 include first corrugated parts 21*a* which are bent during an arrangement of the wire harness 9 to form a bent configuration along an arrangement or wiring path and second corrugated parts 21*b* which are bent in a packed state of the wire harness 9 and during its transportation to forma bent configuration along a packing and transporting form.

The first corrugated parts 21*a* are arranged in positions necessary to fit the wire harness 9 to a vehicle attached configuration, namely, a configuration to which the wire harness 9 is attached or arranged and formed with such lengths as to be adapted to the configuration to which the wire harness 9 is attached or arranged. Thus, the first corrugated parts 21*a* can bend the sheath member 15 with the lengths and at angles necessary for the vehicle attached configuration.

The second corrugated parts 21*b* are arranged at positions necessary to fit the wire harness 9 to the bent configuration during the packing and transportation and formed with such lengths as to be adapted to the bent configuration. Thus, the second corrugated parts 21*b* can bend the sheath member 15 respectively at desired angles in the packed state of the wire harness 9 or during its transportation.

The first corrugated parts 21*a* may have functions as the second corrugated parts 21*b* at the same time. Conversely, the second corrugated parts 21*b* may have functions as the first corrugated parts 21*a* at the same time.

The corrugated parts 21 have rectangular configurations in section intersecting at right angles to the axial direction of the tube and bellows shaped configurations which repeat protruding parts and recessed parts in the axial direction of the tube. Specifically, the corrugated parts 21 are formed in such a way that the recessed parts 26 and the protruding parts 27 respectively formed in a circumferential direction are alternately arranged and formed along the axial direction of the tube. The corrugated parts may have configurations other than the bellows shaped configurations. When the corrugated parts 21 have a flexibility, configurations thereof are not especially limited.

The straight parts 23 are parts which have the flexibility lower than those of the corrugated parts 21 in the sheath member 15, and preferably hold their attitudes to a bending stress, namely, the parts having strength for resisting against a bending. The sheath member 15 can ensure its rigidity in an entire part due to the existence of the straight parts 23. Further, the straight parts 23 also function as parts to which below-described clamps 40 are attached.

The straight parts 23 include straight parts 23*a* for an under-floor arranged in the under-floor 11 of the motor vehicle. Since the straight parts 23*a* for the under-floor are arranged in the under-floor 11 of the motor vehicle (arranged so as to be arranged and extended along, for instance, a lean hose), the straight parts 23*a* for the under-floor are formed to be long. Since the straight parts 23*a* for the under-floor are long, when a difficulty arises during the transportation of the wire harness, the second corrugated parts 21*b* may be provided in intermediate parts of the straight parts 23*a* for the under-floor.

The straight parts 23 have rectangular configurations in section intersecting at right angles to the axial direction of the tube, for instance, linear configurations extending straight in the axial direction of the tube.

The clamps 40 include tube body attaching parts 41 formed so as to meet outer configurations of the straight parts 23 and cantilever fixing parts 42 continuous to the tube body attaching parts 41. In the fixing parts 42, bolt insert holes (not shown in the drawing) are formed to pass through. The wire harness 9 is attached and fixed to an object 43 to be fixed such as the under-floor 11 of the motor vehicle through bolts 44 inserted into the bolt insert holes. When the wire harness 9 is attached and fixed to the object 43 to be fixed, an arrangement of a path is completed.

As post-attaching members other than the clamps 40, clips, grommets, protectors or the like are supposed to be exemplified. The clamps 40 are also vehicle fixing parts and such parts functioning as the vehicle fixing parts may be molded with resin together with the straight parts 23.

In both terminal parts of the wire harness 9, shield connectors 50 are respectively provided. One shield connector 50 is a shield connector of the inverter side. The other shield connector 50 is a shield connector of the battery side. The shield connectors 50 are connected and fixed to the high voltage electrically conductive path 16 pulled out from the corrugated parts 21.

The high voltage electrically conductive path 16 has two high voltage circuits 32. Since the wire harness 9 electrically connects the inverter unit 4 to the battery 5 (the junction block 12), the high voltage circuits 32 are formed to be long.

The high voltage circuit 32 is formed with a conductor and an insulator 36 with which the conductor 35 is coated.

The conductor 35 is manufactured by copper, copper alloy, or aluminum or aluminum alloy. The conductor 35 may have either a conductor structure that element wires are twisted or stranded or a rod shaped conductor structure of a rectangular or round configuration in section (for instance, a conductor structure having a flat type single core or a round single core, and in this case, an electric wire itself is also rod shaped). In such a conductor 35, the insulator 36 made of an insulating resin material is extrusion molded on an outer surface of the conductor 35.

As the high voltage circuit 32, a structure of a well-known high voltage electric wire is used in the present embodiment. However, the high voltage circuit is not limited thereto. Namely, a high voltage circuit which is formed by providing an insulator in a known bus bar may be used.

Further, in the two high voltage circuits, are provided a shield member 33 which covers the two high voltage circuits 32 and a sheath 34 provided outside the shield member 33.

The shield member 33 is an electromagnetically shielding member (a shield member for a countermeasure to an electromagnetic wave) which covers the two high voltage circuits 32 together, and a stranded member is adopted which is formed by stranding many element wires in a tubular form. The shield member 33 is formed to have a substantially same length as an entire length of the two high voltage circuits 32. In the shield member 33, an end part thereof is connected to a shield case (an illustration is omitted) of the inverter unit 4 (see FIG. 1) through the shield connector 50.

For the shield member 33, when the countermeasure to the electromagnetic wave can be made, for instance, a metallic foil having electric conductivity or a member including the metallic foil may be used.

The sheath 34 is formed by extrusion molding an insulating resin material outside the shield member 33 so as to have a prescribed thickness and arranged in a position as an outermost layer of the high voltage electrically conductive path 16. A terminal part of the sheath 34 is worked so as to expose a prescribed length of the shield member 33 in manufacturing the wire harness 9. As a state after the terminal part is worked, the sheath 34 is slightly longer than, for instance, the sheath member 15. Further, in the high voltage electrically conductive path 16, the sheath 34 may not be provided.

The low voltage electrically conductive path 17 is formed with, for in stance, one low voltage circuit. The low voltage circuit includes a conductor 37 and an insulator 38 which covers the conductor 37. The low voltage electrically conductive path 17 is formed so as to have a length necessary for an electric connection.

As shown in FIG. 4 and FIG. 5, the wire harness 9 has a sheet member 30 wound on the high voltage electrically conductive path 16 and the low voltage electrically conductive path 17 so as to cover an entire area in the circumferential direction. Since the sheet member 30 is provided between the high voltage electrically conductive path 16 and the low voltage electrically conductive path 17 and the inner peripheral surface 20 of the sheath member 15, the sheet member 30 has a function for restraining the high voltage electrically conductive path 16 and the low voltage electrically conductive path 17 from coming into direct contact with the inner peripheral surface 20. As long as the sheet member 30 achieves such a function, the sheet member 30 may be realized by any material.

Further, when the sheet member 30 is wound on the electrically conductive paths, the sheet member 30 can achieve another function for preventing the movement of the high voltage electrically conductive path 16 and the low voltage electrically conductive path 17 in the sheath member 15. In order to achieve these functions, the sheet member 30 can use, for instance, a sheet having flexibility. As examples, may be exemplified a soft tape formed with a material having a cushioning property such as rubber or a foaming polyurethane sheet or the like. Further, the thickness of the sheet member 30 can be set such a thickness as to fill up a clearance between the inner surface of the sheath member 15 and the high voltage electrically conductive path 16 the low voltage electrically conductive path 17 when the sheet member 30 is wound on peripheries of the high voltage electrically conductive path 16 and the low voltage electrically conductive path 17.

Here, in place of proving the sheet member 30 over an entire area in the axial direction of the tube of the sheath member 15, the sheet member 30 may be intermittently arranged in the axial direction of the tube. For instance, the sheet member 30 is arranged correspondingly to the straight part 23. Further, the sheet member 30 does not need to be arranged in the entire area in the axial direction of the tube of the straight part 23. One or more sheet members 30 may be satisfactorily arranged at suitable positions.

The sheet member 30 is supposed to cover the high voltage electrically conductive path 16 and the low voltage electrically conductive path 17 together. However, the sheet members 30 may be provided respectively in the high voltage electrically conductive path 16 and the low voltage electrically conductive path 17.

Now, a manufacture, transportation and a path arrangement of the wire harness 9 will be described below.

Initially, after the sheet member 30 is wound on prescribed positions of the high voltage electrically conductive path 16 and the low voltage electrically conductive path 17, the high voltage electrically conductive path 16 and the low voltage electrically conductive path 17 are inserted into the sheath member 15. After that, the shield connectors 50 are provided in both the terminal parts of the high voltage electrically conductive path 16. Thus, the wire harness 9 is manufactured.

After the wire harness 9 is manufactured, the wire harness is bent so as to be folded in sections of the second corrugated parts 21b, so that an entire length of the wire harness 9 is shortened, and the wire harness 9 is packed in the smallest width. Namely, an entire part of the wire harness 9 is packed in a compact state. Then, the wire harness is 9 is transported under the compact state.

The transported wire harness 9 is supplied to an attaching process to the hybrid motor vehicle 1. Then, as shown in FIG. 2, when the first corrugated parts 21a are bent at necessary angles along the arrangement or wiring path of the under-floor 11 of the hybrid motor vehicle 1 to attach and fix the wire harness 9 to the object 43 to be fixed through the clamps 40, the arrangement of the path is completed.

As described above, the wire harness 9 according to the present embodiment includes the high voltage electrically conductive path 16 as the electrically conductive path, the sheath member 15 which is formed with the tubular member of the rectangular configuration and accommodates the high voltage electrically conductive path 16 and the low voltage conductive path 17 therein and the sheet member 30 wound on the electrically conductive paths (the high voltage electrically conductive path 16 and the low voltage electrically conductive path 17) so as to cover an entire area in the circumferential direction.

According to such a structure, since the electrically conductive paths are covered with the sheet member 30, the electrically conductive paths are restrained from coming into direct contact with the inner peripheral surface 20 of the sheath member 15. Thus, the electrically conductive paths are restrained from rubbing against the sheath member 15 or rubbing against dust or sand and a damage of the electrically conductive paths can be suppressed.

In the present embodiment, the electrically conductive path 16 is exemplified as the electrically conductive path. As described above, in the high voltage electrically conductive path 16, the sheath 34 may not be provided. In this case, in the high voltage electrically conductive path 16, since the shield member 33 is located in an outermost layer, the shield member 33 is especially preferably avoided from being damaged. In this respect, since the electrically conductive paths are covered with the sheet member 30, the shield member 33 located in the outermost layer is restrained form coming into direct contact with the inner peripheral surface 20 of the sheath member 15. Thus, the shield member 33 is restrained from rubbing against the sheath member 15 or rubbing against the dust or sand and a damage of the shield member 33 can be properly suppressed.

Further, in the present embodiment, the sheet member 30 is intermittently arranged in the axial direction of the tube of the sheath member 15.

According to the above-described structure, since the sheet member 30 does not need to be provided in the entire area in the axial direction of the tube of the sheath member 15, an increase of a production cost can be suppressed. In this case, even when the sheet member 30 is intermittently arranged, the high voltage electrically conductive path 16 located between the sheet members 30 can be floated from the inner peripheral surface 20 of the sheath member 15 due to the thickness of the sheet member 30. Thus, not only in a part in which the sheet member 30 is provided, but also in a part in which the sheet member 30 is not provided, the electrically conductive path is restrained from rubbing against the sheath member 15 or rubbing against the dust or sand, so that the damage of the electrically conductive path can be suppressed.

In the present embodiment, the sheet member 30 is provided so as to cover an entire area in the circumferential direction of the electrically conductive path, however, the sheet member may be provided only in a part of the circumferential direction. For instance, an influence of friction to the electrically conductive path is distinguished in a direction of gravity. Accordingly, the sheet member 30 may be provided between a lower surface side of the electrically conductive path with an arranged state to the hybrid motor vehicle 1 considered to be a reference and the inner peripheral surface of the sheath member 15. Thus, a situation is suppressed that the electrically conductive path rubs against the lower surface side of the sheath member 15 or rubs against the dust or sand, and the damage of the electrically conductive path can be suppressed.

The wire harness according to the present embodiment is described above, however, the present invention is not limited to the embodiment and may be variously changed within a range of the present invention. For instance, in the present embodiment, the sheath member includes the corrugated parts and the straight parts respectively. The sheet member may be provided not only in the straight parts, but also in the corrugated parts. Further, the sheath member may include only the straight parts. Further, the wire harness is applied not only to the hybrid motor vehicle, but also to an electric vehicle or an ordinary motor vehicle. Further, the electrically conductive path may be not only formed with a plurality of electric wires, but also merely provided with a single electric wire. Further, the sheath member is exemplified in such a way that the sheath member has a rectangular configuration as its sectional form. The present invention is not limited thereto, and various configurations such as an elliptic form or a round form as well as polygonal forms may be adopted.

Here, features of the above-described embodiment of the wire harness according to the present invention will be respectively briefly summarized as described below in [1] to [3].

[1] A wire harness (9) provided with:
an electrically conductive path (a high voltage electrically conductive path 16),
a tubular sheath member (15) which accommodates the electrically conductive path (the high voltage electrically conductive path 16) in an inner part, and
a sheet member (30) positioned between at least a part of a circumferential direction of the electrically conductive path (the high voltage electrically conductive path 16) and an inner peripheral surface of the sheath member (15).

[2] A wire harness (9) according to the above-described [1], wherein the sheet member (30) is wound on the electrically conductive path (the high voltage electrically conductive path 16) so as to cover an entire area in the circumferential direction.

[3] A wire harness (9) according to the above-described [1] or [2], wherein the sheet member (30) is intermittently arranged in an axial direction of a tube of the sheath member (15).

The present invention is described in detail by referring to the specific embodiment. It is to be understood to a person with ordinary skill in the art that various changes or modifications can be made without departing from the spirit and scope of the present invention.

This application is based on Japanese Patent Application (JPA No. 2013-146318) filed on Jul. 12, 2013 and its contents are incorporated herein as a reference.

INDUSTRIAL APPLICABILITY

According to the present invention, the damage of the electrically conductive path accommodated in the sheath member can be effectively suppressed. The present invention having the above-described effect is available to the wire harness.

REFERENCE SIGNS LIST

1 . . . hybrid motor vehicle
2 . . . engine
3 . . . motor unit
4 . . . inverter unit
5 . . . battery
9 . . . wire harness
11 . . . under-floor of vehicle
15 . . . sheath member
16 . . . high voltage electrically conductive path 17 . . . low voltage electrically conductive path
21 . . . corrugated part
23 . . . straight part
26 . . . recessed part
27 . . . protruding part
30 . . . sheet member
40 . . . clamp
43 . . . object to be fixed
44 . . . bolt
50 . . . shield connector

What is claimed is:

1. A wire harness comprising:
an electrically conductive path;
a tubular sheath member which accommodates the electrically conductive path in an inner part; and
a sheet member positioned between at least a part of a circumferential direction of the electrically conductive path and an inner peripheral surface of the sheath member,
wherein the sheet member is intermittently arranged in an axial direction of a tube of the sheath member.

2. A wire harness comprising:
an electrically conductive path;
a tubular sheath member which accommodates the electrically conductive path in an inner part; and
a sheet member positioned between at least a part of a circumferential direction of the electrically conductive path and an inner peripheral surface of the sheath member,
wherein the sheet member is wound on the electrically conductive path so as to cover an entire area in the circumferential direction.

3. The wire harness according to claim 2, wherein the sheet member is intermittently arranged in an axial direction of a tube of the sheath member.

4. A wire harness comprising:
an electrically conductive path;
a tubular sheath member which accommodates the electrically conductive path in an inner part; and
a sheet member positioned between at least a part of a circumferential direction of the electrically conductive path and an inner peripheral surface of the sheath member,
wherein the electrically conductive path includes a high voltage electrically conductive path and a low voltage electrically conductive path.

5. The wire harness according to claim 4, further comprising a shield member which covers the high voltage electrically conductive path.

6. The wire harness according to claim 5, wherein the shield member comprises metallic foil having electrical conductivity.

7. The wire harness according to claim 5, further comprising a sheath on outer peripheral surface of the shield member and on inner peripheral surface of the sheet member.

8. The wire harness according to claim 7, wherein the sheath is formed by extrusion molding an insulating resin material outside the shield member so as to have a prescribed thickness and arranged in a position as an outermost layer of the high voltage electrically conductive path.

9. The wire harness according to claim 4, wherein the sheet member is provided between the high voltage electrically conductive path and the low voltage electrically conductive path and the inner peripheral surface of the tubular sheath member, whereby the sheet member prevents the high voltage electrically conductive path and the low voltage electrically conductive path from coming into direct contact with the inner peripheral surface of the tubular sheath member.

* * * * *